March 5, 1940.   W. RABKIN ET AL   2,192,755
PHOTOGRAPHIC APPARATUS
Filed Feb. 17, 1937   11 Sheets-Sheet 1
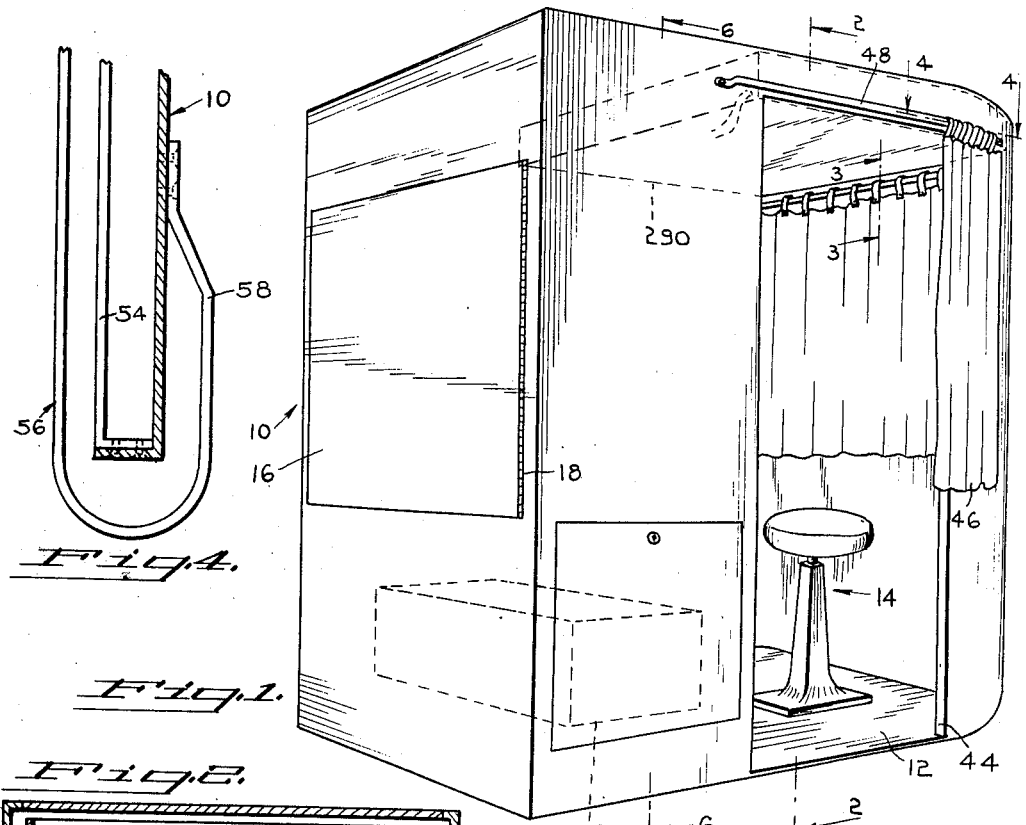
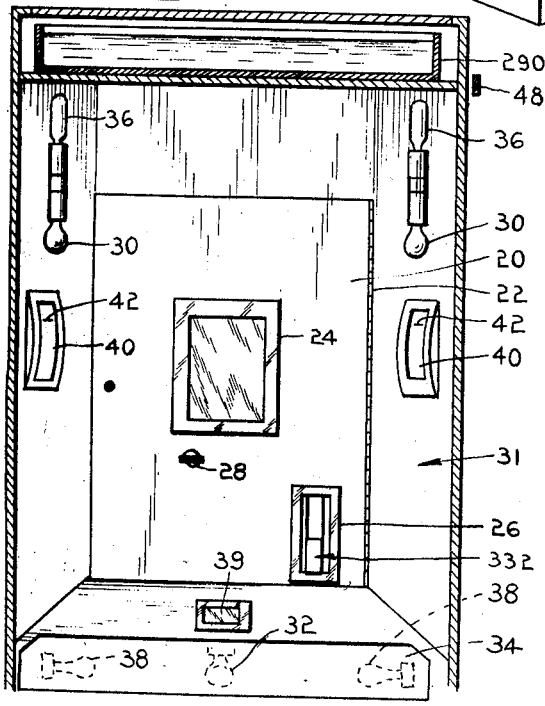
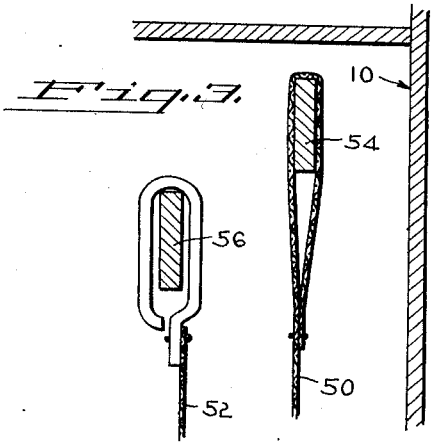
INVENTORS
LEO EINAR LARSEN
AND WILLIAM RABKIN.
BY Edwin Levisohn
ATTORNEY

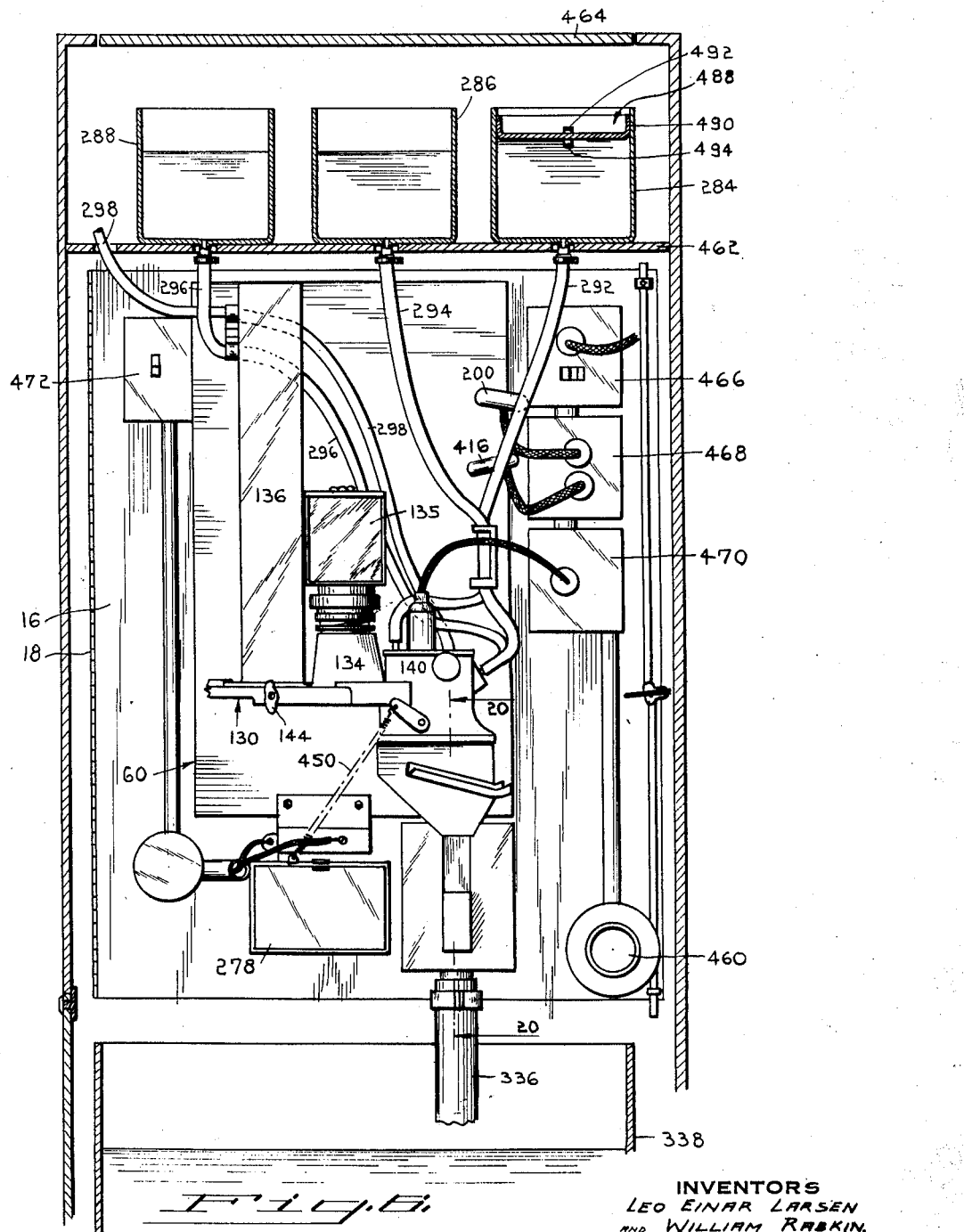

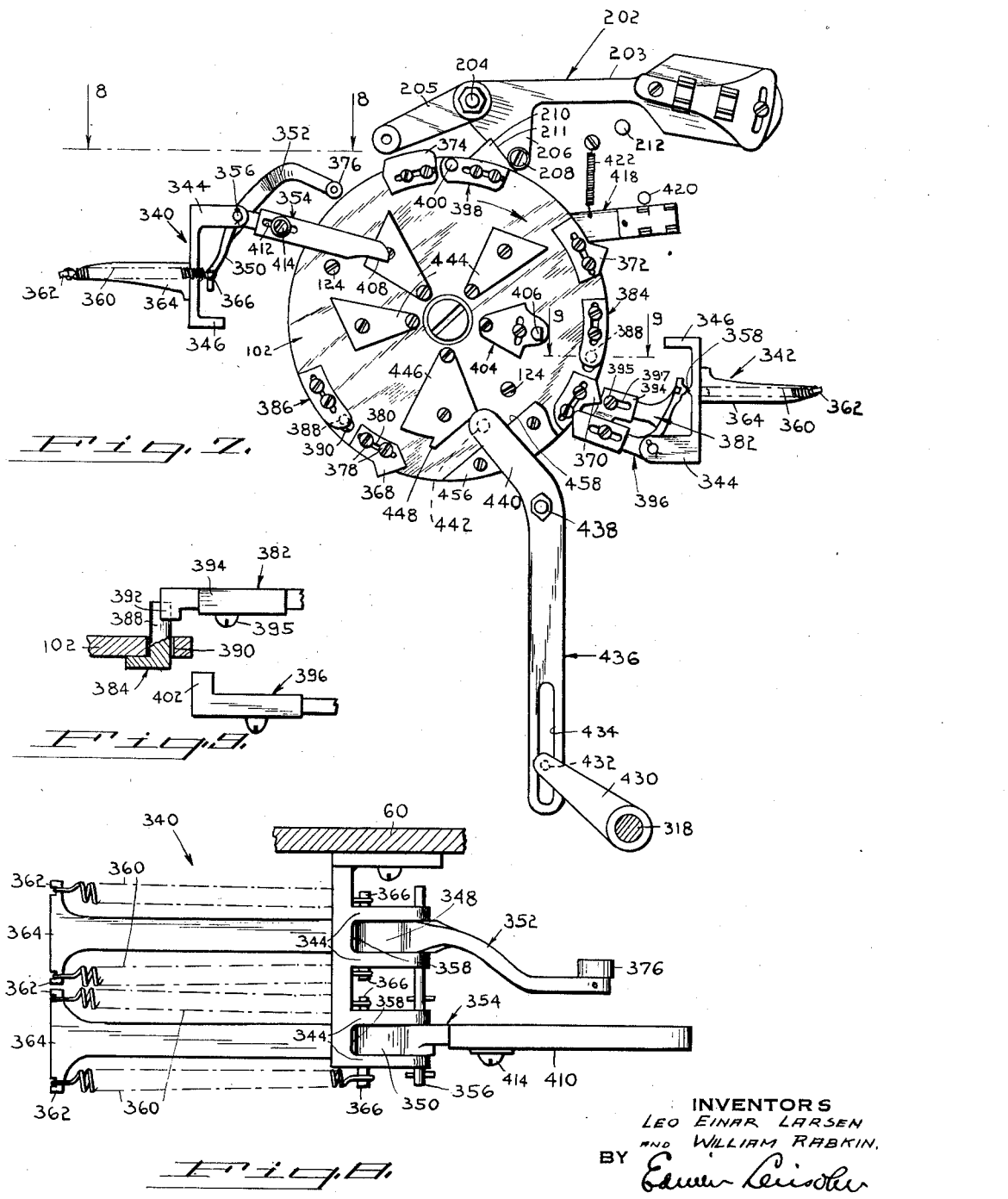

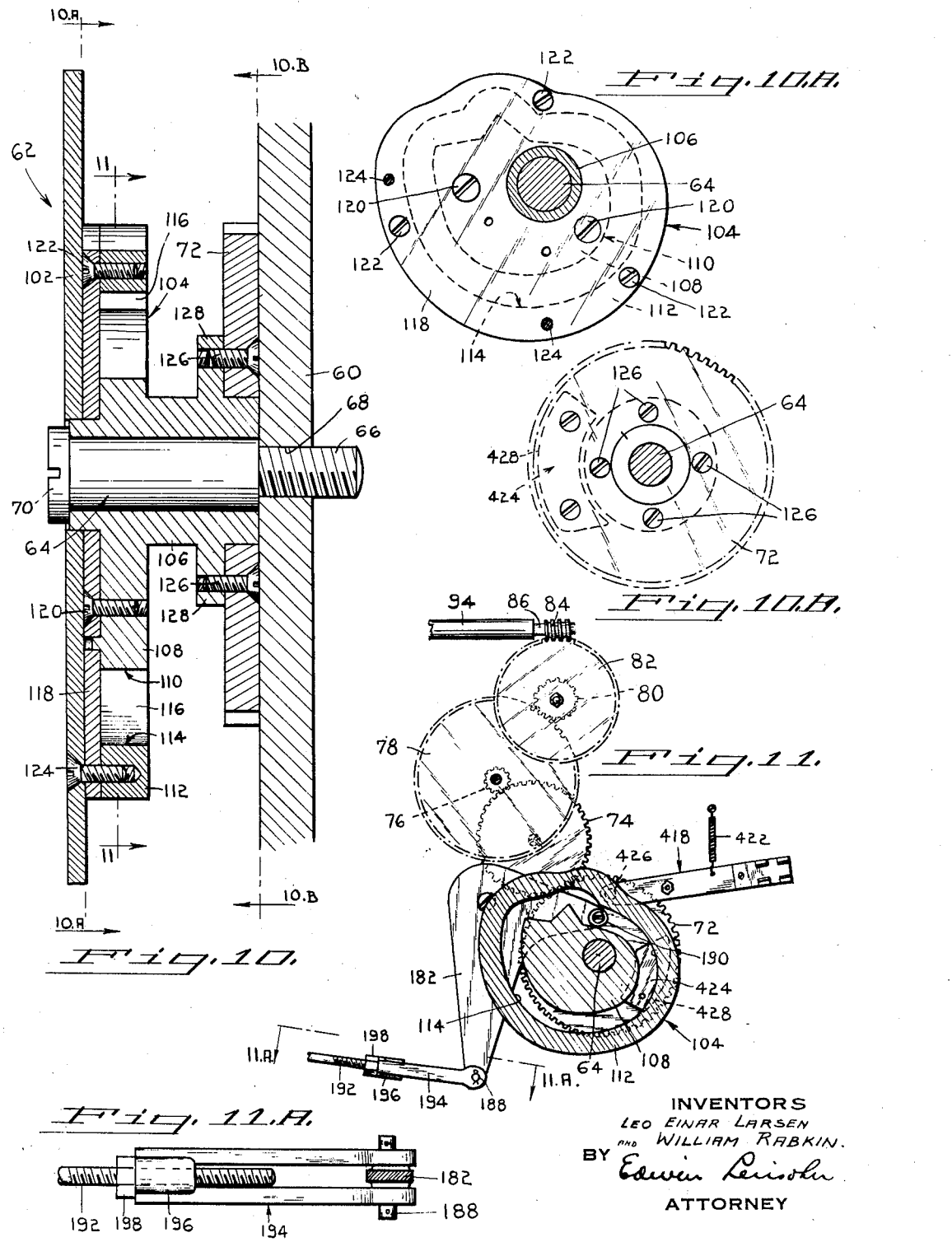

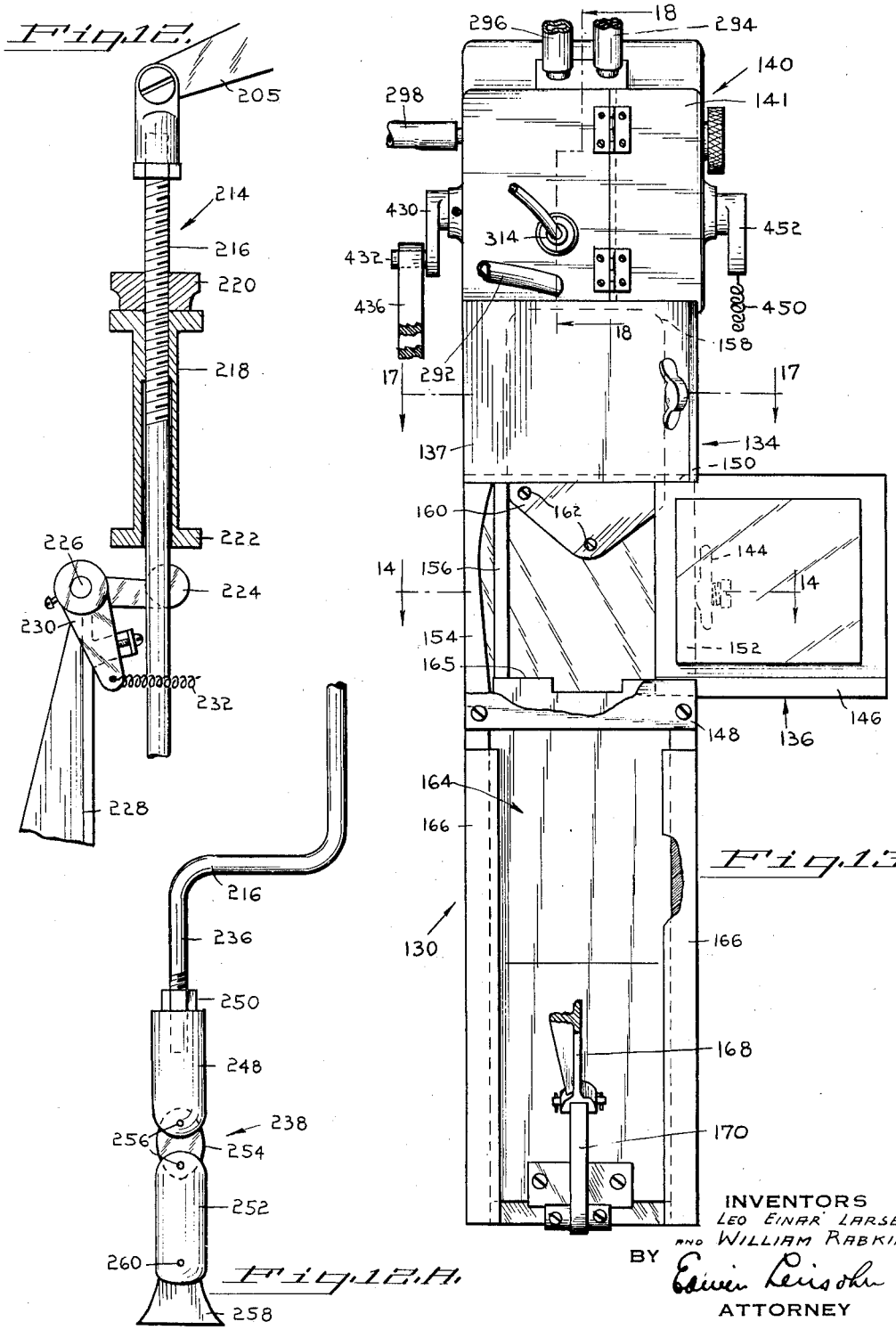

March 5, 1940.  W. RABKIN ET AL  2,192,755
PHOTOGRAPHIC APPARATUS
Filed Feb. 17, 1937   11 Sheets-Sheet 7
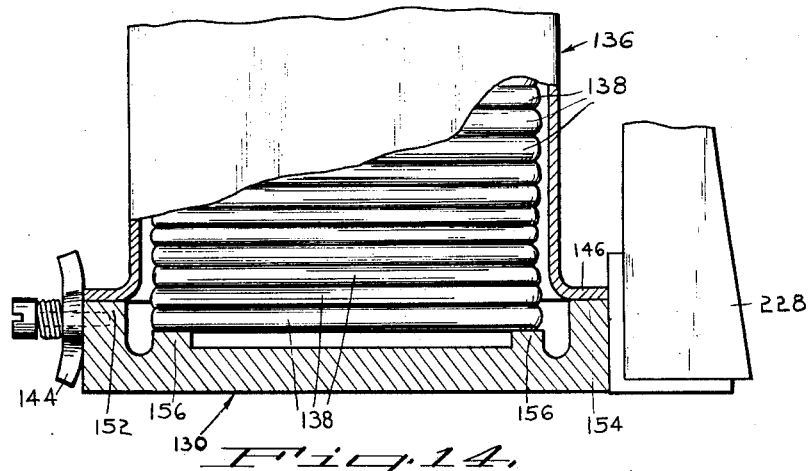
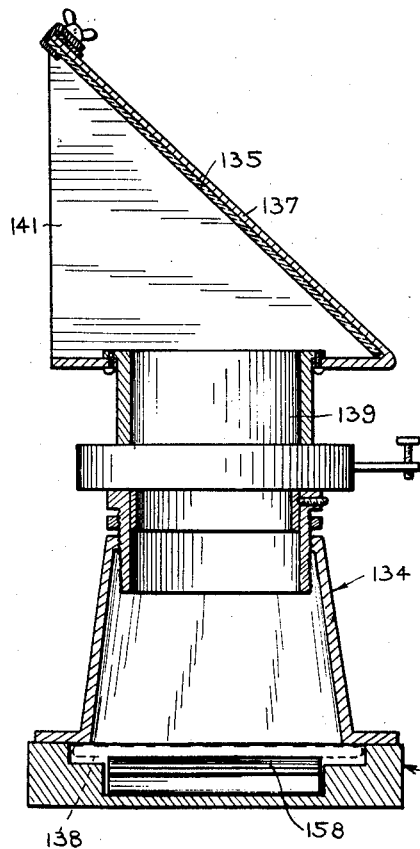
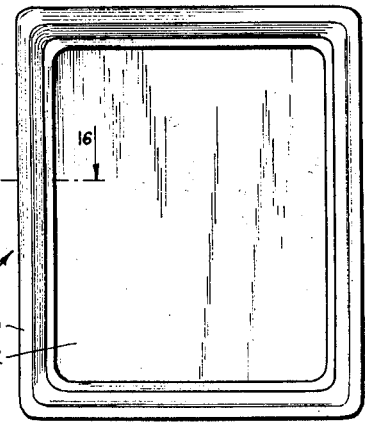
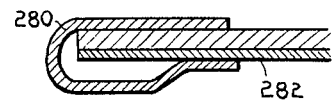
INVENTORS
LEO EINAR LARSEN
AND WILLIAM RABKIN
BY Edwin Leusohn
ATTORNEY

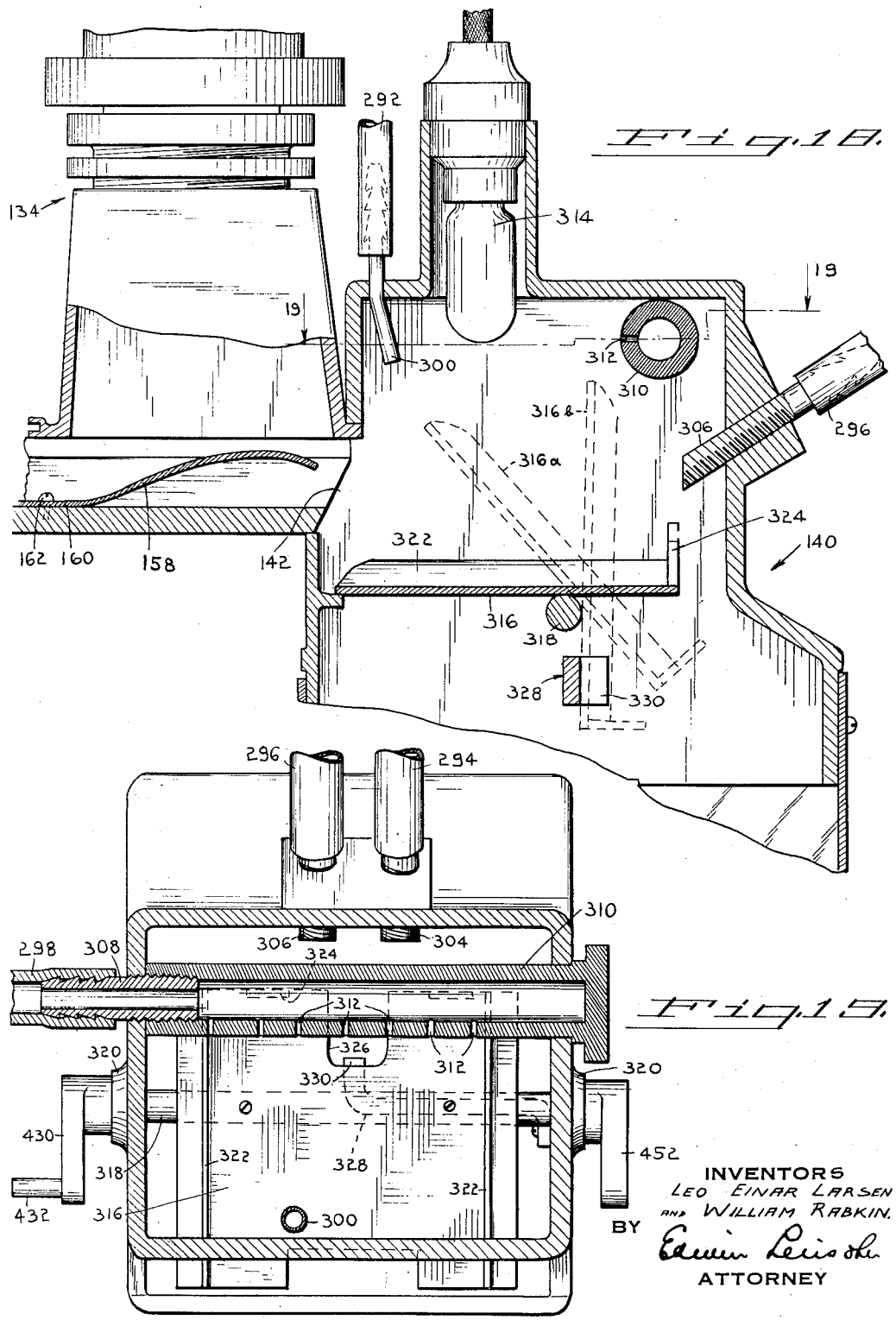

March 5, 1940.  W. RABKIN ET AL  2,192,755
PHOTOGRAPHIC APPARATUS
Filed Feb. 17, 1937   11 Sheets-Sheet 9

INVENTORS
LEO EINAR LARSEN
AND WILLIAM RABKIN.
BY Edwin Levinson
ATTORNEY

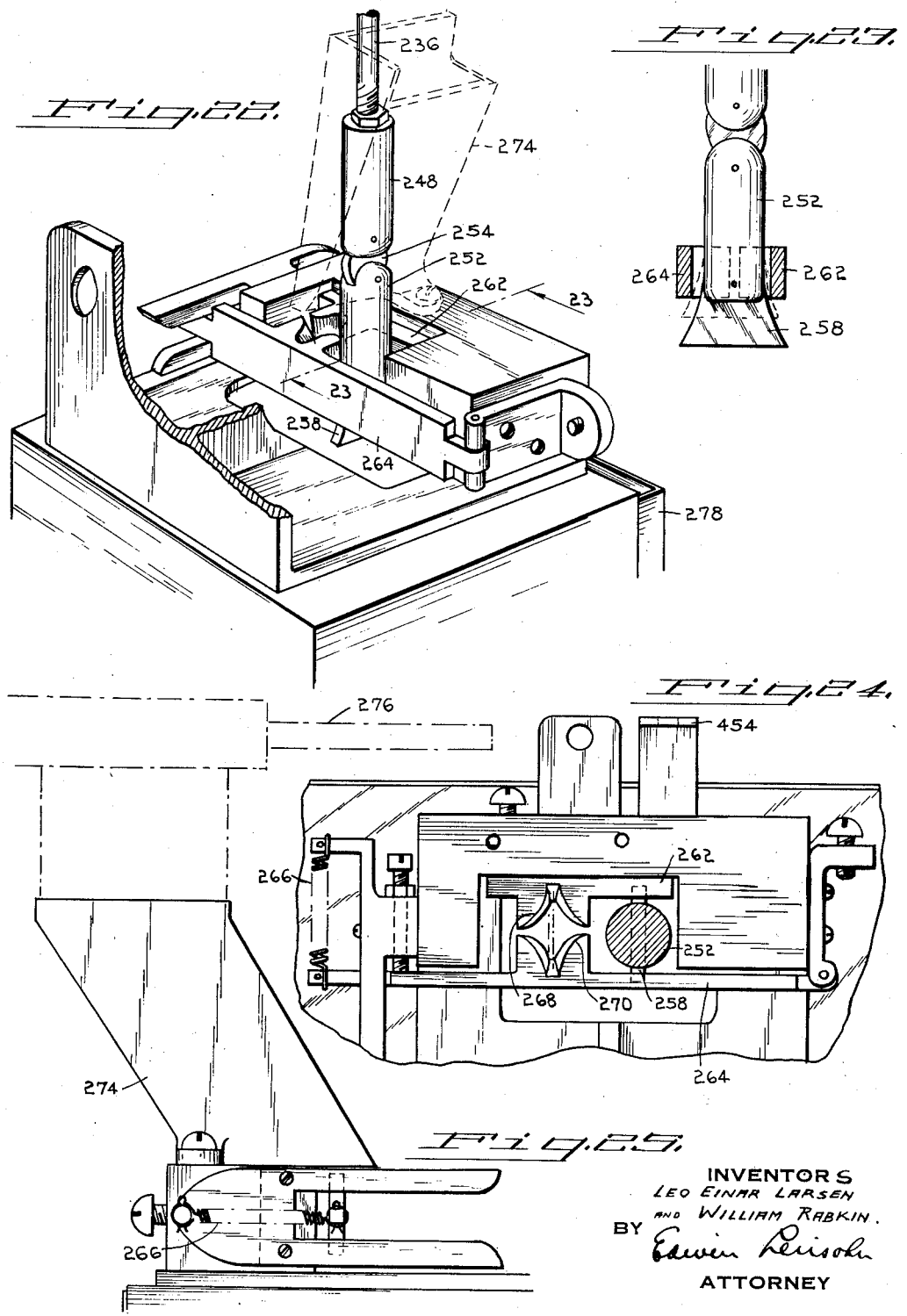

March 5, 1940.  W. RABKIN ET AL  2,192,755
PHOTOGRAPHIC APPARATUS
Filed Feb. 17, 1937  11 Sheets-Sheet 11
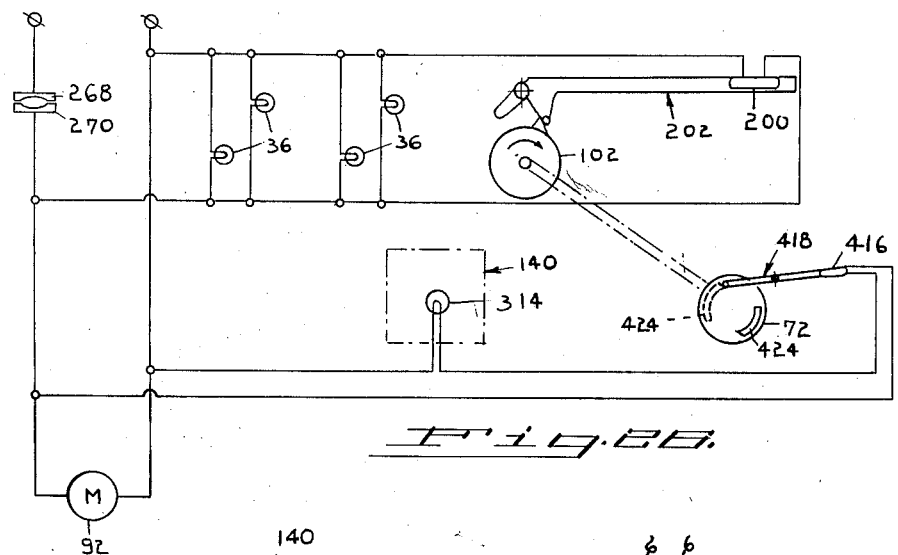
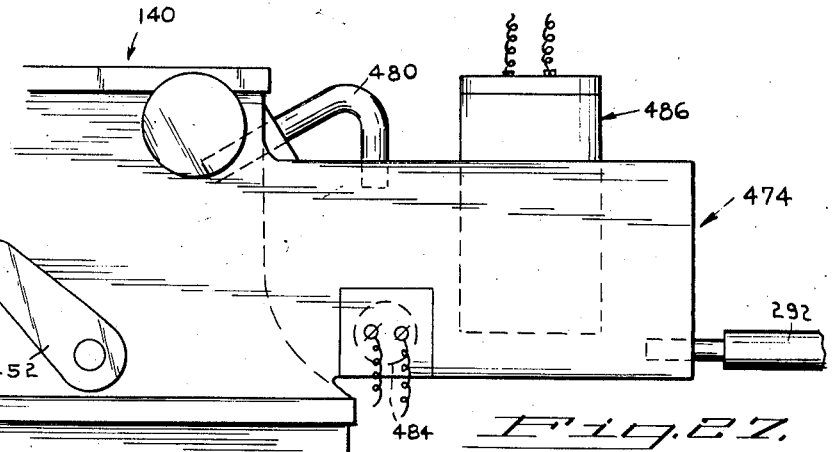
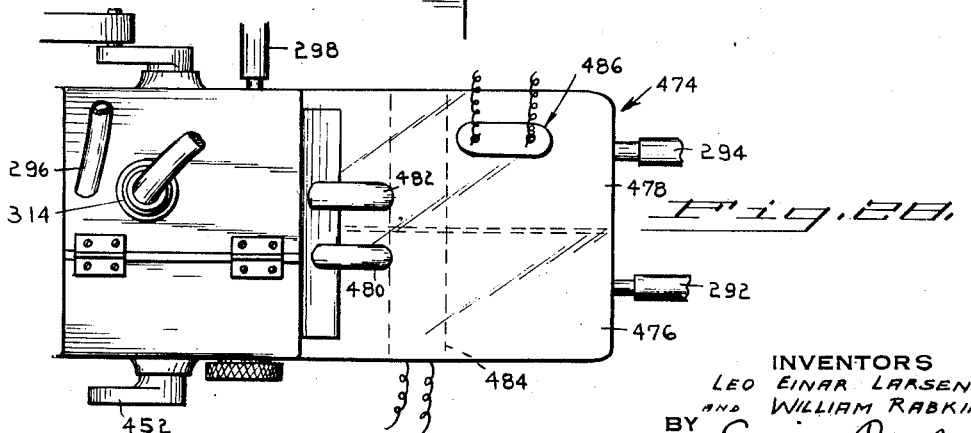
INVENTORS
LEO EINAR LARSEN
AND WILLIAM RABKIN.
BY
ATTORNEY Patented Mar. 5, 1940

2,192,755

UNITED STATES PATENT OFFICE 2,192,755

PHOTOGRAPHIC APPARATUS

William Rabkin, New York, and Leo Einar Larsen, Jackson Heights, Long Island, N. Y.; said Larsen assignor to said Rabkin Application February 17, 1937, Serial No. 126,280

28 Claims. (Cl. 95—14)

This invention relates to automatic photographic machines or apparatus by which photographs may be taken and developed and complete positives delivered within a short time.

The photographic process preferably carried out in the machine embodying the present invention is known as the re-exposure or re-development process for producing the positive picture on a sensitized plate, and one object of the present invention is to provide a machine of simplified construction for carrying out said process in an improved manner whereby to produce more satisfactory pictures than has heretofore been possible with previous machines.

In carrying out the photographic process, after the plate is exposed for taking the picture, it is necessary in the development and re-development of the exposed plate to treat the latter successively with several chemical solutions and to rinse said plate with water several times in the course of treatment of said plate by the several chemical solutions as well as after the final chemical treatment and just prior to the delivery of the plate as a finished picture. Another object of the invention is to provide a simple device for removing the liquids, that is the chemicals and water from the plate after each application of the several liquids with which the plate is treated in the development and re-development thereof.

Another object of the invention is to provide improved means for delivering the sensitized plates to the exposure, development, and re-development stations, and to the delivery chute of the machine.

Another object of the invention is to provide the machine with improved means for operating the several mechanisms utilized therein, as well as to simplify such mechanisms so that the machine will operate efficiently and reliably.

A further object of the invention is to provide a photographic machine with improved means for maintaining the plate treating liquids at the proper temperature best suited to the production of satisfactory pictures within the relatively short time necessarily allotted for taking pictures by reason of the dictates of commercial requirements.

The development solution utilized in machines of this character is subject to comparatively rapid deterioration due particularly to oxidation, and on this account in the operation of such machines on a commercial basis unsatisfactory results frequently ensue. It is, therefore, an object of this machine to provide means for preserving the developing chemicals or to substantially retard the deterioration thereof.

A further object of the invention is to provide the machine with certain safety devices for the purpose of protecting the machine against injury in the event of the improper operation thereof.

Another object is to provide a cabinet of improved construction and equipped with means designed to enable the person whose photograph is to be taken to obtain a picture which may conform to such person's tastes and desires. In this connection, it is also an object of the invention to provide the cabinet with means to enable the subject to position himself or herself properly in relation to the camera of the machine.

A yet further object of the invention is generally to improve the construction and operation of automatic photographic machines.

The above objects of the invention and other objects ancillary thereto will be fully understood from the following description considered with reference to the accompanying drawings.

In the drawings:

Fig. 1 is a perspective view of a photographic machine embodying the present invention;

Fig. 2 is a sectional view on the line 2—2 of Fig. 1;

Fig. 3 is a fragmentary sectional view on the line 3—3 of Fig. 1;

Fig. 4 is a fragmentary sectional view on the line 4—4 of Fig. 1;

Fig. 6 is a vertical sectional view on the line 6—6 of Fig. 1, with parts omitted for the sake of clearness in illustration;

Fig. 7 is a front view in elevation of the rotating cam unit and certain of the parts associated therewith and operated thereby;

Fig. 8 is a detail top plan view on the line 8—8 of Fig. 7;

Fig. 9 is a detail sectional view on the line 9—9 of Fig. 7;

Fig. 10 is a sectional view of the rotating cam unit;

Fig. 10a is a sectional view on the line 10a—10a of Fig. 10;

Fig. 10b is a sectional view on the line 10b—10b of Fig. 10;

Fig. 11 is a sectional view on the line 11—11 of Fig. 10, showing also certain mechanism associated with the cam unit;

Fig. 11a is a detail top plan view on the line 11a—11a of Fig. 11;

Fig. 12 is a view partly in elevation and partly in section of the mechanism for opening the shutter of the camera and showing also the upper part of the switch operating means;

Fig. 12a is a side view of the movable switch member and the lower part of the switch operating means;

Fig. 13 is a top plan view of part of the apparatus and showing the magazine for sensitized plates, the plate slide, and the top of the camera and developing chamber, the plate magazine being partly removed;

Fig. 14 is a sectional view on the line 14—14 of Fig. 13 but showing the magazine slide in normal installed position;

Fig. 15 is a top plan view of one of the sensitized plates;

Fig. 16 is a fragmentary sectional view of the line 16—16 of Fig. 15;

Fig. 17 is a sectional view on the line 17—17 of Fig. 13;

Fig. 18 is a sectional view on the line 18—18 of Fig. 13;

Fig. 19 is a sectional view on the line 19—19 of Fig. 18;

Fig. 22 is a perspective view, partly in section, of the coin actuated circuit controller;

Fig. 23 is a detailed sectional view on the line 23—23 of Fig. 22;

Fig. 24 is a plan view partly in section of the circuit closer;

Fig. 25 is a side view of the circuit closer and the associated coin chute;

Fig. 26 is a circuit diagram;

Fig. 27 is a side view of the developing chamber and a heater associated therewith in accordance with one form of the invention; and Fig. 28 is a top plan view of the developing chamber and heater shown in Fig. 27.

Figure 5:
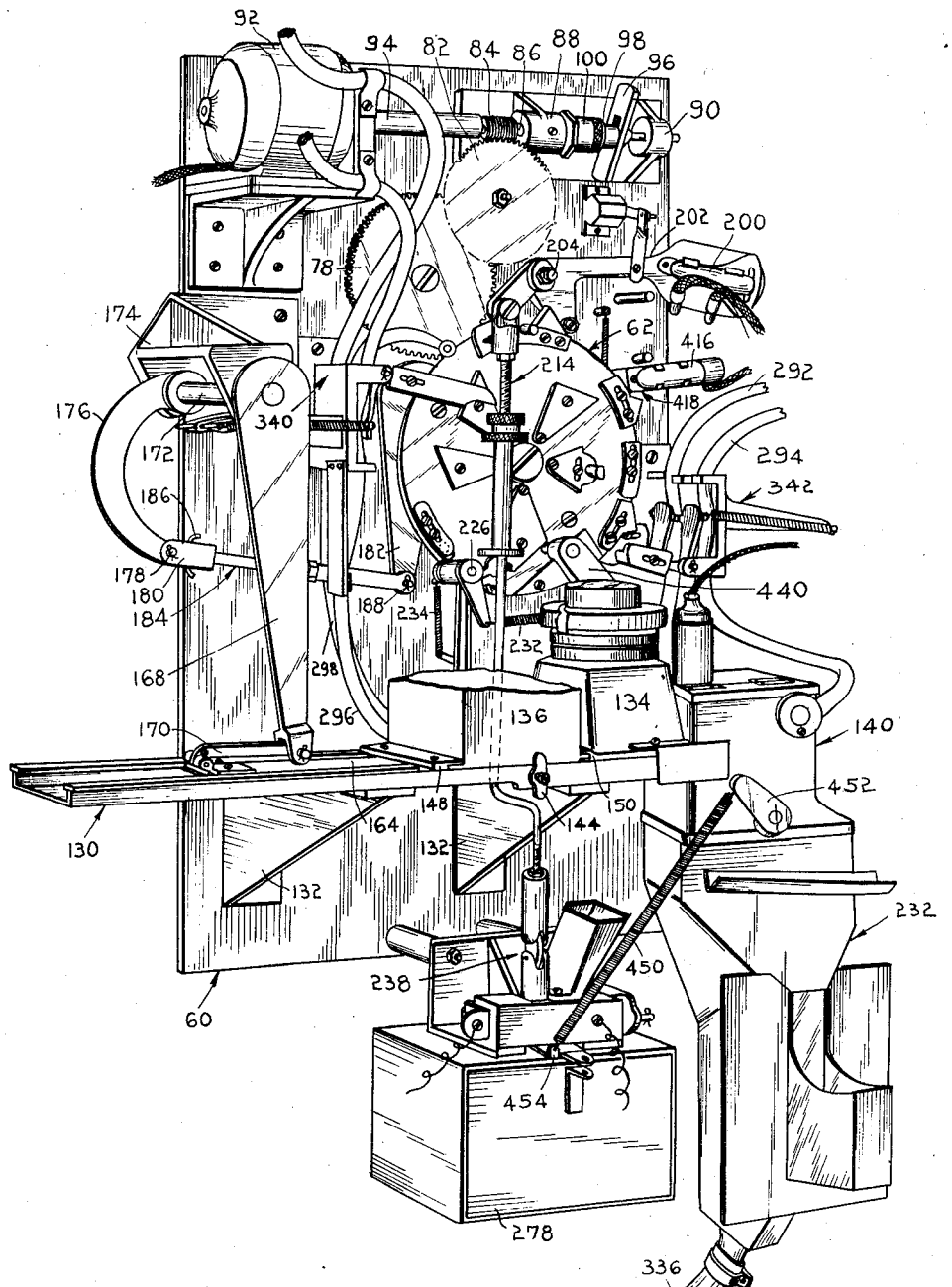
Fig. 5 is a front perspective view of the apparatus which is mounted within the cabinet shown in Fig. 1.
Figure 21:
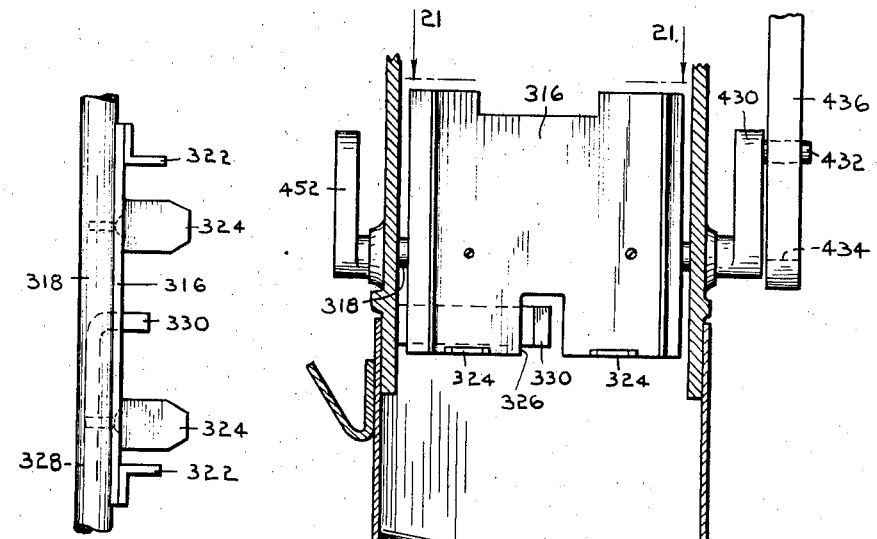
Fig. 21 is a detailed plan view on the line 21—21 of Fig. 20.

Referring to the drawings in detail, the photographic machine embodying the present invention comprises a portable cabinet 10 having a base 12 on which the adjustable seat 14 is secured. The photographic apparatus is housed within a compartment closed at the rear of the cabinet by a door 16 hinged as at 18. The front of said compartment is closed by a door 20 hinged as at 22. The door 20 is provided with a glass covered opening 24 which registers with the camera for taking the picture of the subject, and also with an opening 26 which registers with the outlet opening of the delivery chute and through which the delivery compartment of the latter projects to permit removal of the picture. Said door also is provided with an opening 28 for the coin slide. The front part of the cabinet, in which the seat 14 is located, is illuminated by lights 30 mounted at the upper part of the door frame 31 and by a lamp 32 mounted below said door frame behind a translucent ground glass panel 34. Said lights 30 and 32 are constantly on so that the compartment of the cabinet which is occupied by the subject to be photographed may be continuously illuminated whether or not the machine is in operation.

Photographic lights 36 are mounted at the upper part of the frame 31 and other photographic lights 38 are mounted below said frame and behind panel 34. Said photographic lights are normally off but are energized for a sufficient length of time during the operation of the machine for properly illuminating the subject for picture taking purposes. A telltale light 39 is provided for indicating that the machine is being operated. This light goes on immediately after the coin is deposited and remains on until a finished picture is dispensed. Convex mirrors 40 are mounted on the frame 31 to enable the person to be photographed to adjust his or her position in relation to the camera exposure opening 24. Said mirrors are provided with horizontal lines 42 and the arrangement is such that when the eyes of the subject are level with said lines the subject is in proper position for the taking of the picture.

The cabinet is provided with entrance and exit openings 44, one at each side, and a curtain 46 is hung in any suitable manner as from a bar 48 so that the curtain may be extended over said openings while a picture is being taken. Two curtains 50 and 52 are arranged behind the seat 14 and are suspended from bars 54 and 56 respectively. Bar 54 terminates within and at the sides of the cabinet while bar 56 has portions 58 which extend outwardly of the cabinet, being bent around the edge of the cabinet wall adjacent the opening 44 so that the curtain 52 may be disposed entirely outside of the cabinet during the taking of a picture, if so desired. The curtain 52 is normally in two sections which together are wide enough to cover the curtain 50 and yet narrow enough so that each section may be disposed on the bar portion 58 outside of the cabinet. The curtain 50 is normally white or of some other light color, while the curtain 52 is normally of some dark color such as blue. Thus by covering or uncovering the curtain 50, a picture with a lighter or darker background may be obtained.

The photographic apparatus, the organization of which is best shown in Figs. 5 and 6, is mounted on a supporting panel 60 carried by the rear door 16. The said apparatus comprises a rotary cam unit 62 which controls the operation of the machine and actuates certain mechanisms in proper sequence to energize the photographic lights 30 and 34, to feed a sensitized plate to the camera in a position to be exposed, to open the shutter of the camera, to move the exposed plate to the developing chamber, to supply the various chemical solutions and rinsing water in proper sequence to said plate, to tilt the latter after each application of liquid thereto so that the liquid will flow off and thus be removed from the plate, to energize the light for re-developing the plate, to dispense the finished picture, and to control the branches of the electric circuit as well as the main circuit during each operation of the machine for taking and completing the picture. The cam unit 62 is mounted for rotation on a bearing 64 (Fig. 10) secured to the panel 60, for which purpose said bearing is provided with a reduced screw threaded portion 66 secured within a screw threaded opening 68 in panel 60. The bearing member 64 is also provided with a slotted head 70 which holds the cam unit in fixed position longitudinally of the bearing between said head and the panel. The cam unit included a gear 72 which is engaged by a gear 74 (Fig. 11) of a train of gears which also includes gears 76, 78, 80, and worm wheel 82 mounted on suitable bearings, each of which is fixed at one end thereof to panel 60 and projects the necessary distance therefrom. The gears of said train are rotated by a worm gear 84 which meshes with worm wheel 82. Said worm gear 84 is formed on a shaft 86 mounted at its ends in bearings 88 and 90. Said shaft is actuated by an electric motor 92, the shaft of which is coupled to shaft 86 by a flexible coupling 94. Said flexible coupling may be of any suitable construction but as here shown comprises a rubber tube fitted over and tightly gripping the adjacent end portions of the motor shaft and of the gear shaft 86, said adjacent ends of the shaft being spaced from each other within said rubber tube. A centrifugal governor 96 is fixed to shaft 86 and carries a shoe 98 in position to engage an adjustable stationary friction member 100, when said shaft exceeds a predetermined speed, thereby to reduce the speed of shaft 86.

The construction of cam unit 62 will now be described more fully with particular reference to Figs. 7, 10, 10a, and 10b. As here shown, said unit comprises a circular cam plate 102 and a sectional cam member 104. Cam member 104 comprises a hub 106 by which the cam unit is journalled for rotation on bearing 64 and which is provided with an integral flange portion 108. Said cam portion has an outer peripheral cam surface 110, the outline of which is shown in dotted lines in Fig. 10a. An annular section 112 is provided with an inner peripheral cam surface 114 which is spaced from and confronts cam surface 110 forming therewith a peripherally continuous cam groove 116. Cam sections 108 and 112 are secured in fixed relative position to a plate 118 by means of screws 120 and 122 respectively. Plate 102 is fastened to cam member 104 by screws 124 which are threaded into plate 118 and cam section 112. Gear 72 of the cam unit is fastened to cam 104 by screws 126 threaded into the flanged portion 128 of hub 106. In addition to the cam groove 116, the cam unit 62 and more particularly plate 102 and gear 72 carry a plurality of cam elements which will be hereinafter more specifically referred to in the course of the description of the construction and operation of the parts of the machine associated therewith.

The means for feeding the sensitized plate from the magazine to the camera and to the redevelopment chamber will now be described with particular reference to Figs. 5, 6, and 13 to 17. As shown in Fig. 5 a guide table and support 130 is supported in horizontal position below cam unit 62 on brackets 132 secured to panel 60. The camera 134 is mounted on and secured to table 130 adjacent one end thereof.

As the sensitized plate is exposed in horizontal position, for which purpose the camera lens tube is in a vertical position, the camera is provided with means here shown as a mirror 135 for reflecting the light rays through the lens tube. As best shown in Fig. 17, said mirror is mounted in a hood 137 supported at the upper end of the lens tube 139. When the cabinet door 20 is closed, the open end 141 of said hood is close to or engages the glass panel in the door opening 24.

A magazine 136 for a stack of sensitized plates 138 is removably mounted on table 130 adjacent one side of camera 134, and a developing and redeveloping chamber 140 is mounted on said table adjacent the other side of said camera. Said chamber is provided with a top hinged closure 141. A continuous passage is formed in table 130 for the full length thereof, for the movement of a single sensitized plate 138 from the magazine 136 to the camera 134 for exposure when the picture is taken, and from the camera to chamber 140 for developing and re-developing and finishing the picture. The chamber 140 has an opening 142 which registers with said passage so that the plate, after it is exposed, may be projected into the chamber to be developed and finished in the manner hereinafter described. As illustrated in Fig. 13, the magazine 136 which is closed at its top may be removed from table 130 for the purpose of refilling the same with a stack of sensitized plates after which the refilled magazine may be replaced on the table in the position illustrated in Figs. 5, 6, and 13 in which position it may be held by a releasable latch 144. It will be observed by reference to Fig. 13 that the bottom of the magazine has a peripheral flange 146 which slides between guide members 148 and 150 secured to the top of table 130 and the upper surface of the front and rear sides 152 and 154 respectively of table 130.

When the magazine is thus positioned the lowermost plate 138 rests on the rails 156 formed in the upper surface of table 130 between its sides 152 and 154 and below the upper surfaces, which are engaged by the magazine flange 146. A spring plate 158 is secured in position below the camera 134 to the upper surface of table 130, one end portion 160 of said plate being fastened to the top of the table between guide rails 156 at the magazine position by means of screws 162 and the rest of the plate being free from attachment and inclined upwardly toward the chamber of the camera, so that when a sensitized plate is fed from the magazine to the camera said spring is effective to press said plate against the bottom of the camera chamber for holding said plate in proper relation to the camera lens.

The plates are moved from the magazine to the camera by a slide plate 164. Said slide plate 164 which is mounted for longitudinal movement on the table 130 and more particularly between guide rails 156 and guide plates 166 which are secured to the upper surface of the table sides 152 and 154 in overlapping sliding engagement with the upper surface of slide plate 164.

The means for moving slide plate 164 comprises an oscillatory arm 168 (Fig. 5) connected to the rear end of said plate by a link 170 pivotally connected at its ends to the rear end of said plate and to one end of said arm. The other end of said arm is fixed to one end of an oscillatory shaft 172 journalled in a bracket 174 mounted on panel 60. Shaft 172 is oscillated by a lever 176 fixed at one end to said shaft and pivotally connected at its other end by means of a pivot pin 178 to a coupling 180. Said lever is connected to a bellcrank lever 182 (Figs. 5 and 11) by means of an adjustable and sectional link 184. Said link 184 is connected at one end thereof to coupling 180 by a soft metal pin 186 which shears off and releases said connection when slide 164 encounters abnormal resistance, as when one of the sensitized plates becomes jammed and cannot be moved in a normal manner through its path from the magazine through the camera and into the developing chamber. The other end of link 184 is pivotally connected by pin 188 to one end of one arm of the bellcrank lever 182. The free end of the other arm of said bellcrank lever is provided with a pin roller 190 which projects into the cam groove 116 of cam 104. By this arrangement and by reason of the design of the cam groove slide plate 164 is caused to move with suitable intervening dwell periods to project a sensitized plate from the magazine to the camera and from the camera to the developing chamber after which the slide plate is caused to move in the opposite direction until the forward end 165 thereof is returned to a position for engagement with the next plate of the magazine for projecting the next plate. It will be understood that as slide plate 164 moves a plate from the magazine to the camera, said slide plate engages the plate previously moved into the camera and thereby moves that last mentioned plate, after the exposure thereof into chamber 140. For the purpose of regulating the distance of travel of pusher 164, link 184 is adjustable and comprises a threaded section 192 and a bifurcated section 194 having a threaded socket 196 which adjustably receives the end of section 192. The holding nut 198 is threaded on section 192 for engagement with socket 196 to releasably hold said sections in adjusted position.

When the machine is operated for taking a picture, the cam unit 62 is effective to actuate a switch here shown as a mercury switch 200 which makes and breaks a circuit through the photographic lamps 36 and 38. Said switch is carried by a lever 202 pivoted intermediate the ends thereof on a bearing pin 204 fixed to panel 60. Said lever is provided with a depending portion 206 having a forwardly projecting pin roller 208 which is adapted to be engaged by a cam member 210 fixed to and projecting radially from, plate 102 of cam unit 62. Said cam member 210 has two converging edges so that the lever 202 is actuated for but a short period of time so that the photographic lamps are energizes only for the time necessary to obtain the desired exposure of the subject. The lever arm 203 on which the switch 200 is mounted is weighted so that it tends to move said lever to a position against the stop member 212 in which position the mercury switch 200 interrupts the circuit through the photographic lamps.

Provision is made for opening the shutter of the camera immediately after the photographic lamps are illuminated under the control of the switch 200. For this purpose an operating member 214 is connected to the arm 205 of lever 202. Said operating member comprises a rod 216 having a screw threaded portion on which a sleeve 218 is adjustably secured and releasably held in adjusted position by a nut 220. The bottom end of said sleeve is provided with a peripheral flange 222 for engagement with a lever 224 fixed at one end of a pivoted pin 226 journalled at the upper end of standard 228. A lever 230 is fixed to the other end of shaft 226 and is connected to a spring 232 which in turn is connected to the mechanism for opening the shutter of the camera. Movement of lever 224 is resiliently opposed by spring 234. By adjusting the sleeve 218 longitudinally of rod 216 the time during which the camera shutter is open can be regulated.

It will be understood that when cam plate 102 is rotated in a clockwise direction as indicated by the arrow in Fig. 7, the cam 210 will engage the cam roller 208 of the lever 202, thereby raising the lever arm 203 so as to tilt the mercury switch to a position for closing the circuit through the photographic lamps and depressing the lever arm 205 whereby to lower rod 216 for bringing the flanged end 222 of sleeve 218 into engagement with lever arm 224 for opening the camera shutter. It will be observed that said shutter is not opened until after the photographic lights are illuminated and is not closed until said lights are deenergized. It will be noticed that as cam roller 208 engages cam member 210 during the rotation of cam plate 102, said roller rides up and down on the converging sides of said cam member whereby the lever 202 is first actuated to close the circuit through the photographic lamps and almost immediately thereafter is actuated in the opposite direction to move the mercury switch in position to break the circuit through said lamps, and that during the time said photographic lamps are illuminated the operating member 214 engages and releases the shutter operating mechanism so that the shutter is opened for the necessary period of exposure while said lamps are illuminated.

The operating member 214, actuated by the lever 202 under the control of cam 210, is also effective to control the main electric circuit of the machine following the initial closing thereof by the coin-operated switch. The manner in which this is accomplished will now be described. Rod 216 has a lower offset portion 236 which carries an adjustable switch member 238. Said switch member comprises a block 248 of insulation material adjustably secured to the bottom of rod portion 236 by companion screw-threaded portions on said rod and block, and a nut 250 is provided for securing said block in adjusted position. A lower block 252 is pivotally connected to block 248 by a flat metal link 254 which is pivoted to both blocks by means of pivot pins 256. A metal switch contact member 258 is rigidly secured to the bottom of block 252 by a pin 260. Said member is wedge shaped, as shown, whereby upon upward movement of rod 216, following the actuation of lever 202 as described above, said member engages relatively movable switch contact members 262 and 264, which are illustrated more or less in detail in Figs. 22 to 25. As here shown, said contact members 262 and 264 are normally held by means of a spring 266 in the position illustrated in Fig. 24 and are insulated from each other. Said members include confronting coin-receiving slotted portions 268 and 270. Slotted portions 268 and 270 underlie a coin chute 274 into which a coin may be deposited by means of a coin slide 276. Thus, when a coin is deposited in said chute it engages said slotted portions of the relatively movable switch contact members and completes the main electric circuit of the machine. This results in the operation of electric motor 92 and the rotatio of cam unit 62 whereby to actuate the lever 202 in the manner described above. Upon the return movement of rod 216, which takes place as soon as pin roller 208 is disengaged from cam member 210, movable switch member 258 engages between the relatively movable contact members 262 and 264 thereby spreading said members apart to permit the coin to drop into the coin box 278, but maintaining the circuit closed during the remainder of one complete revolution of cam plate 102 of cam unit 62.

At the completion of one revolution of plate 102, cam member 210 is positioned, as shown in Fig. 7, to engage cam roller 208 so that lever 202 is moved by the inclined edge 211 of cam member 210 to lower rod 216 an amount sufficient to withdraw switch contact member 258 from engagement with switch contact members 262 and 264, respectively, thereby interrupting the main circuit of the apparatus and stopping the operation of the machine.

After an exposed sensitized plate is moved into the chamber 140, said plate is converted into a finished positive picture in accordance with the re-development or re-exposure process of photography. In the course of developing a finished sensitized plate to complete the picture, in accordance with this process and in accordance with the present invention, the several chemical solutions and the rinsing water are applied to the exposed surface of said plate while the latter is in horizontal position, with exposed sensitized surface thereof uppermost, and between the applications of the several chemical solutions and of the rinsing water, the plate is tilted to remove the liquid by allowing it to drain therefrom. It will be observed particularly by reference to Figs. 15 and 16 that the sensitized plate is contained in a metal frame 280 which together with the sheet material 282 of said sensitized plate forms a shallow receptacle for the liquids with which said plate is treated. Referring now more particularly to Figs. 6, 18 to 21, it will be observed that provision is made for causing several chemical solutions and rinsing water to flow into chamber 140 for treating the sensitized plate. Thus, a container 284 of developing solution, a container 286 of bleaching solution, a container 288 of clearing solution and a water tank 290, supported in the upper part of the cabinet 10, are connected by means of flexible rubber tubes 292, 294, 296, and 298, respectively, to chamber 140. The chemical tubes 292, 294, and 296 are connected to companion metal nozzles 300, 304, and 306, respectively, fixed in the walls of chamber 140. Water tube 298 is connected by means of a coupling 308 to a tubular member 310 provided with a plurality of orifices 312 whereby a plurality of fine streams of water is directed over the surface of the photographic plate to thoroughly rinse the same.

Figure 20:
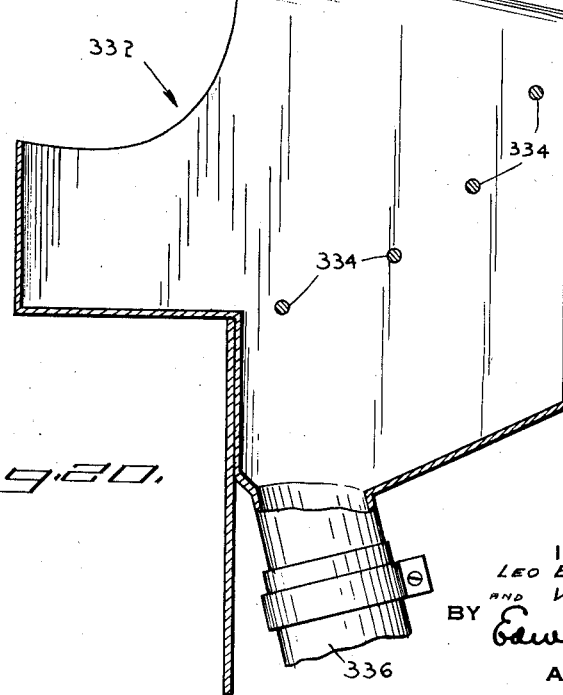
Fig. 20 is a sectional view on the line 20—20 of Fig. 6, showing the plate tilting member in vertical position for discharging the picture.

As the plate is re-exposed and re-developed to form the positive picture in chamber 140, said chamber is provided with a photographic light 314 mounted therein in position for exposing the plate in said chamber in position to the action of said light. During the application of the chemicals the sensitized plate is supported in horizontal position on a tiltable support 316 fixed to a shaft 318 mounted for rotation in bearings 320 formed in opposite side walls of chamber 140. Said support is as here shown an open-top tray and has low side walls 322 and spaced end projections 324 disposed on opposite sides of a cut-out 326 formed in the forward edge of the support. A bar 328 is positioned below support 316 and is secured at one of its ends to a wall of chamber 140 and has a free end portion 330 which is directed forwardly in alignment with the cut-out 326 of support 316. By this construction and arrangement, the plate, when on the support in the horizontal position of the latter shown in full lines in Fig. 18, receives the successive chemical solutions and at the proper time is re-exposed to the action of the photographic lamp 314. After each application of the chemical to the plate the support is moved to the intermediate inclined position indicated in dotted lines and designated by the reference numeral 316a in which position rinsing water is applied to the sensitized plate. It will be observed that in this position of the plate support the projections 324 prevent the sensitized plate from sliding off the support. After the last application of chemical solution, and following the last application of rinsing water, the support 316 is moved to a vertical position, illustrated in dotted lines in Fig. 18 and designated by the reference numeral 316b. When the support is in vertical position the portion 330 of bar 328 engages the sensitized plate and moves or ejects the latter beyond the free ends of projections 324 thus allowing said plate to slide off support 316 into delivery chute 332 from which it may be removed at opening 26 provided in the cabinet door 20. As shown in Fig. 20, said delivery chute is provided with spaced rods 334 which guide the finished picture into the outlet compartment of the delivery chute. Openings thus provided between said rods permit the passage of waste liquids from chamber 140 through the bottom of chute 332. An outlet pipe 336 is connected to the bottom of the delivery chute for conducting the waste chemicals and rinsing water to a waste receptacle 338 positioned in the bottom of the cabinet 10.

The means and mechanisms for controlling the flow of the chemical solutions and of the rinsing water to the sensitized plate at the proper times, for controlling the energization of the photographic lamp for re-exposure of the plate, and for tilting the support 316 at the proper times, will now be described. Flow of the liquids from the respective tubes is controlled by pinch-cocks provided on levers pivotally mounted in brackets 340 and 342 adjacent the cam unit 62 whereby said levers are actuated in proper sequence by the cam members which will hereinafter be described. Only bracket 340 will be specifically described, as bracket 342 is of the same construction as bracket 340, although said brackets are in relatively inverted positions. Thus referring more particularly to Figs. 7 and 8, it will be observed that bracket 340 is secured to panel 60 and projects forwardly therefrom. Said bracket is provided with two sets of upper spaced fingers 344 and two sets of similar lower fingers 346. The liquid tubes are positioned between said fingers for engagement by the pinch-cocks. In bracket 340, water tube 298 is positioned between the rear sets of upper and lower bracket fingers and tube 296 for the clearing solution is disposed between the front set of upper and lower fingers. The pinch-cocks 348 and 350 for said tubes, respectively, are integral with the levers 352 and 354 pivotally mounted on bracket pin 356. Ribs 358 are formed integral with bracket 340 in position to engage the tubes at the portions thereof which are pressed by the pinch-cocks 348 and 350 whereby to completely close said tubes against the passage of liquid therefrom when the pinch-cocks are in tube closing position. Each of said pinch-cocks is normally held releasably in said position by two tension springs 360 which are connected to the ends 362 of horizontally extending bracket members 364 and to laterally projecting ears 366 adjacent the free ends of said pinch-cocks.

Lever 352 which controls the passage of water is actuated successively at intervals by a plurality of cam members 368, 370, 372, and 374. Said cam members are secured to cam plate 102 adjacent the periphery thereof and project beyond said periphery to engage cam roller 376 on lever 352 thereby to rotate said lever in a counter-clockwise direction to release the pinch-cocks carried thereby so that water may flow through tube 196. It will be observed that cam members 368, 370, and 372 have pointed portions which engage cam roller 376 for a relatively short time while cam member 374 has a straight edge so that said cam engages cam roller 376 for a relatively long time. The amount of water thus permitted to flow by reason of the engagement of the pointed cam members is sufficient for the rinse following the application of the chemical solutions prior to the end of the process, while the larger amount of water permitted to flow by engagement of the straight cam 374 with the cam roller 376 provides a more thorough rinsing of the picture at the conclusion of the photographic process, thus removing any trace of chemical from the picture before it is discharged through the delivery chute. It will be observed that said cam members are adjustably mounted on cam plate 102 by screws 378 which extend through a slot 380 in each of said cam members.

A pinch-cock lever 382 which controls the flow of developing solution is pivotally mounted in the bracket 342 and is actuated to open the tube first by cam member 384 and later by cam member 386. Each of said cam members is adjustably secured to the front of cam plate 102 in the same manner as cam member 386, but does not extend peripherally beyond said cam plate. Instead, each of cam members 384 and 386 is provided with a pin 388 which projects beyond the rear surface of said cam plate through an opening 390 formed therethrough. As cams 384 and 386 are identical in construction, Fig. 9, which shows the relation of the cam 384 to lever 382, also may be considered as showing the relation of said lever to cam 386. Lever 382 has a laterally offset portion 392 disposed in the path of pin 388 whereby said lever is actuated to open the tube for the passage of the developing liquid. The offset portions of lever 392 is provided on a part 394 which is slidably adjustable longitudinally of the lever and is secured in adjusted position by means of a screw 395 which passes through a slot 397 in said part and engages the lever.

It will be observed that cam 384 is positioned so that cam pin 388 will actuate lever 382 to release the tube for the flow of the developing fluid after the actuation of lever 202 by cam member 210 to expose the sensitized plate and immediately after the slide 164 has moved the exposed plate from the camera into chamber 140. Following the application of the developing liquid to the sensitized plate, the support 316 and the plate carried thereby are tilted to the inclined position shown in Fig. 18 in the manner which will be later described.

While the plate is in said inclined position the pinch-cock 350 of the water tube is released to permit water to pass into the water distributing tube 310 for rinsing the plate, said first rinsing operation being under the control of cam 368. After the plate is rinsed the support 316 is returned to horizontal position for positioning the sensitized plate on which the negative of the picture has now been developed for further treatment. The bleaching solution is then applied. The pinch-cock lever 396, which controls the flow of bleaching solution is mounted on bracket 344 and is actuated by cam 398. Said cam is secured to cam plate 102 adjacent the periphery of the latter, but does not project beyond said periphery, said cam being provided with a pin 400 which projects forwardly for engagement with the laterally offset portion 402 of lever 396. The part of lever 396 which is provided with said offset portion is adjustable longitudinally of the lever, for which purpose the slot and screw connection shown in Fig. 7 is provided. Following the application of bleaching solution the plate support and the plate carried thereby is again tilted to inclined position and rinse water is again applied to the plate, this time under the control of cam 370, after which the plate is again returned to horizontal position for further treatment.

The next liquid to be applied to the plate is the clearing solution. The flow of that liquid is controlled by pinch-cock lever 354 which is actuated by cam 404. Said cam is adjustably secured to cam plate 102 near the central portion thereof and is provided with a forwardly projected pin 406 which engages the forward end 408 of said lever for actuating the latter. It will be observed that lever 354 has a part 410 which is adjustable longitudinally of the lever by a connection comprising a slot 412 and a screw 414 similar to the slot and screw connection of the adjustable parts of levers 382 and 396.

At about the time the clearing solution is applied to the plate the latter is re-exposed for making the positive. Accordingly, at this time photographic lamp 314 is illuminated. The circuit for said lamp is controlled by a mercury switch 416 mounted on a pivoted lever 418 (Figs. 7 and 11). Said lever is releasably held in circuit-opening position against a stop pin 420 by a tension spring 422 and is moved to circuit-closing position by a cam member 424 which is secured to the gear member 72 of cam unit 62. The lever 418 is provided with a cam roller 426 which in a predetermined position in relation to gear member 72 is engaged by the outer side edge 428 of cam member 424, and thereby moves the lever 418 and the switch 416 carried thereby to circuit-closing position in which position said switch remains for the length of time necessary to re-expose the photographic plate.

While the re-exposure lamp 314 is illuminated the plate is tilted to remove the clearing solution, and after the plate is again returned to horizontal position, the developing solution is again applied to the plate under the control of cam 386. At about the time the developing solution is applied to the photographic plate for the second time, as just described, the circuit of the re-exposure lamp is interrupted by movement of the switch lever 418 against the stop pin 420, following the release of the cam roller 426 from cam member 424. The support 316 is then tilted to move the plate to inclined position for the purpose of removing the developing solution therefrom and while the plate is in tilted position, the final application of rinse water is made under the control of cam member 374. At or about the time the final rinsing of the plate is completed, the support 316 is moved to vertical position shown in Fig. 18 and indicated in dotted lines designated by the reference character 316b. In moving from inclined position 316a to vertical position 316b, the photographic plate is engaged by the finger 330 of part 328, as previously described, and is thereby released from the supporting member and permitted to slide therefrom and thus ejected from chamber 140 into the delivery chute.

The means for tilting supporting member 316 will now be described. As clearly shown in Figs. 7 and 20, the shaft 318 to which the photographic plate support 316 is secured is provided with a crank arm 430 having a crank pin 432 engageable in a longitudinal slot 434 of a lever 436. Said lever is pivotally mounted on a bearing member 438 projecting forwardly from the panel 60. The upper arm 440 of said lever is provided with a pin 442 for engagement with tilting-cam members 444 and tilting, ejecting-cam members 446. Said pin has a flat surface which is engaged by the side edges of said cam members 444 and 446 for actuating lever 436 to rotate shaft 318 for tilting photographic plates 316 at the proper times in the course of the photographic process. Cam member 446 differs somewhat from cam member 444 in that the former is designed not only to tilt the support 316a to inclined position, but also to move said support from said inclined position to vertical position 316b, and for that purpose, cam 446 is provided with a projection 448.

The actuation of the shaft 318 by lever 436 is resiliently opposed by a spring 450 connected at one of its ends to a crank arm 452 of shaft 318, and at its other end to a stud 454 fixed to the top of the coin box 270. Said spring also returns the plate support 316 to horizontal position under the control of cam members 444 and 446. To assist the spring 450 in returning the plate 316 to horizontal position, after the latter has been moved to vertical position for discharging the photographic plate, cam member 456 is provided. Said cam member 456 on cam plate 192 is in position to engage lever pin 442 just before the revolution of said cam plate is completed thereby engaging the edge 458 of the cam member 456 with lever pin 442 and moving said lever in a direction to effect return of plate support 316 to a horizontal position. Immediately after this occurs the cam member 210 is brought into engagement with the cam roller 208 of lever 202 in the position illustrated in Fig. 7 thereby lowering the switch rod 236 and disconnecting the movable switch contact 258 from engagement with the switch contact members 262 and 264 thus interrupting the main electric circuit and stopping the operation of the machine.

The complete operation of the machine from the time the coin is deposited in the coin chute to the time the finished positive picture is delivered has been described above in connection with the description of the construction of the machine and the several parts thereof. Although further description of the operation of the machine is, therefore, unnecessary, it may be observed that the entire operation as hereinbefore stated takes place during only one complete revolution of cam unit 62 and that in actual practice said revolution takes place within about one minute, or in other words, a picture is taken, developed, redeveloped, and delivered as a finished positive picture within about one minute. It will further be observed that a sensitized plate is in position within the camera chamber ready for exposure at the time the machine is set into operation by the deposit of a coin. The plate has been thus positioned within the camera chamber ready for exposure at the time the previously exposed plate was moved, during the previous operation of the machine, from the camera chamber to the developing and redeveloping chamber. Thus, it is unnecessary to delay the exposure of the plate in the next operation of the machine and for that reason the photographic lights are illuminated as soon as the coin is deposited in the coin chute.

For best results in producing pictures by the machine embodying the present invention is is desirable to maintain the developing and bleaching liquids at a suitable temperature of about 80° F. to 90° F. Accordingly, unless the outside temperature is higher than 90° F. it is necessary to provide a heater which may be disposed within the compartment in which the photographic apparatus is contained. Thus, as shown in Fig. 6 an electric heater 460 is provided and may be controlled by a thermostat (not shown) for maintaining the temperature of said compartment within a suitable range. It will be understood that the top partition wall 462 is provided with openings so that the heat may reach the chemical solutions mounted on said top partition, although preferably, said partition wall is made of metal which conducts heat to the containers for said chemicals and to said chemicals. Access to the containers for said chemical solutions may be obtained through pivoted closure 464 on the top of the cabinet. In Fig. 6 there are shown outlet receptacles 466, 468 and 470 for terminal plugs of the heater, of the mercury switches and of the re-exposure lamp, respectively. There is also shown a manual switch 472 for opening and closing of the main circuit connected to the motor 92.

When a heater such as that shown in Fig. 6 is utilized considerable time may be required before the developing and bleaching solutions are heated to the temperature necessary to obtain best results in the production of pictures within the short time allotted to a single operation of the machine. Furthermore, considerable electrical energy is consumed by such a heater. Therefore, in accordance with the preferred form of the invention, provision is made for heating the developing and liquid solutions directly as the latter are supplied to the developing and redeveloping chamber. Thus, as illustrated in Figs. 27 and 28, a heating chamber 474 is mounted adjacent chamber 140 and is provided with a compartment 476 for the developing liquid and a compartment 478 for the bleaching liquid, the inlet tubes 292 and 294 being connected to said compartments at the bottoms thereof. Outlet tubes 480 and 482 are connected at the tops of said compartments 476 and 478, respectively, for conducting the developing and bleaching liquids, respectively, into the development chamber 140. An electric heater 484 of any suitable type is disposed adjacent the bottom of chamber 474 for heating the liquids with compartments 478 and 476. A thermostatic control unit 486 is disposed in the compartment 278 and is responsive to the temperature of the liquid therein for controlling the heater 484 whereby to maintain the temperature of the developing and bleaching liquids as desired. The thermostatic control unit 486 is disposed in the compartment 478, because said compartment may be smaller in volumetric capacity than compartment 476 since the quantity of bleaching liquid used during the operation of the machine is less than the quantity of developing liquid, since the latter is twice applied to the sensitized plate during the photographic process. It will be observed that since the outlets for the heated liquids are at the top of chamber 474, a sufficient supply of said liquids at the proper temperature is always available. It will be understood that the cool liquids enter at the bottom of the chamber and that said compartments are normally filled with their respective liquids which are forced through the outlet tubes 480 and 482 when the pinch-cocks hereinbefore described are released to permit the flow of liquids through their respective tubes. By the arrangement here shown, not only is the quantity of electrical energy necessary to maintain the liquids at the proper temperature considerably reduced as compared with the heating arrangement illustrated in Fig. 6, but said liquids may be heated within a very short time to the proper temperature. In the present arrangement, the clearing solution is supplied by means of the tube 296 connected at the coupling at the top of chamber 140 in place of the tube 292 for the developing liquid, as hereinbefore described.

In accordance with the present invention, provision is made for preventing rapid deterioration of the developing solution. As said deterioration is due largely to oxidation of the developing solution, means is provided for greatly minimizing, if not entirely eliminating, access of air to the solution within its container. Accordingly, for this purpose, as shown in Fig. 6, a float 488 made of stainless sheet steel is fitted into the container 284. Said float conforms to the shape of the container and while it is slidable therein so that it may follow the liquid level it has a sufficiently close fit to substantially eliminate the contact of air with the developing solution. Said float has a peripheral rim 490 which prevents the liquid from flowing to the upper surface of said float as the latter is, due to its weight, partially immersed in the liquid. A handle 492 is attached to the upper surface of the float for convenience in removing the latter from the container and a stop member 494 projects from the lower surface of the float to limit the downward movement of the latter. If desired, a similar float may be provided in the containers of the other chemical solutions.

While we have shown and described in considerable detail the preferred embodiment of the invention as the same is at present in commercial use, it will be understood that the invention is capable of other embodiments and that certain changes in the construction and arrangement of parts may be made without departing from the principles of the invention. It will also be understood that machines embodying at least some of the principles of the present invention may be utilized in the production of photographs made in accordance with photographic processes other than the re-exposure process herein mentioned. Therefore, unless otherwise specified in the claims, I do not wish to be limited precisely to the machine as herein disclosed or to any specific mechanism or combination of mechanisms disclosed herein.

What we claim and desire to secure by Letters Patent is:

1. In a photographic machine, a camera for exposing a sensitized plate while said plate is in horizontal position, a chamber in which said plate is treated, means for positively moving said exposed plate in horizontal position from said camera to said chamber, means for supporting said plate in said horizontal position in said chamber with the sensitized surface thereof uppermost, means for applying a developing liquid to said surface within said chamber, means for removing the developing liquid from said plate, means for applying a bleaching liquid to said plate, means in said chamber for re-exposing said plate, and means for applying a developing liquid to said re-exposed plate.

2. In a photographic machine, the combination of a magazine for holding sensitized plates of the direct positive type in horizontal position, a camera, a slide for conveying a single plate from said magazine to said camera with said plate in horizontal position for exposure therein in taking the picture, a chamber, said slide being operable for positively moving the exposed plate in horizontal position from said camera to said chamber, means for applying a developing liquid to the exposed sensitized surface of said plate in said chamber to develop the negative, means for applying a bleaching liquid to said plate, means for subsequently re-exposing said plate in said chamber, and means for applying a developing liquid to said re-exposed plate in said chamber for developing the positive.

3. In a photographic machine, the combination of a magazine for holding sensitized plates of the direct positive type in horizontal position, a camera, a slide for conveying a single plate from said magazine to said camera for exposure therein in taking the picture, a chamber, said slide being operable for moving the exposed plate from said camera to said chamber, means for movably supporting the exposed plate in said chamber with the sensitized plate surface uppermost, means for applying a developing liquid to said surface while the plate is in horizontal position, means for moving said plate from said horizontal position to a position for draining said liquid from the plate and for subsequently returning said plate to horizontal position, means for subsequently applying a bleaching liquid to said surface, means operable after the application of said bleaching liquid to re-expose said plate, and means for developing the re-exposed plate.

4. In a photographic machine, a magazine for sensitized plates of the direct positive type, a camera for exposing one of said plates in taking the picture, a chamber in which said exposed plate is treated, means for moving plates in horizontal position from said magazine to said camera and, after exposure in said camera, from the latter to said chamber while said plates are in horizontal position, means for supporting the exposed plate in horizontal position in said chamber, with the sensitized surface of the plate uppermost, means for applying a developing liquid to said surface to develop the negative, means for subsequently applying a bleaching liquid to said surface, means operable after said bleaching liquid is applied to apply a clearing liquid to said surface, means for thereafter re-exposing said plate, means for applying a developing liquid to said re-exposed plate and means operable intermittently to tilt said support to drain the liquids applied to said plates.

5. In a photographic machine, the combination of a magazine for holding sensitized plates of the direct positive type in horizontal position, a camera, a slide for conveying a single plate from said magazine to said camera for exposure therein in taking the picture, a chamber, said slide being operable for positively moving the exposed plate from said camera to said chamber, means for developing and rinsing said plate in said chamber, means for re-exposing and re-developing said plate in said chamber, means for rinsing said plate following the re-development thereof, a delivery chute in communication with said chamber, means for supporting said plate in horizontal position in said chamber, and means for tilting said supporting means for transferring the finished picture from said chamber to said delivery chute.

6. In a photographic machine, the combination of a magazine for holding sensitized plates in a horizontal position, a camera, a slide for conveying a single plate from said magazine to said camera for exposure therein in making the picture, a chamber, said slide being operable for positively moving the exposed plate from said camera to said chamber, means for developing and rinsing said plate in said chamber, means for re-exposing and re-developing said plate in said chamber, means for rinsing said plate following the re-development thereof, a delivery chute in communication with said chamber, and means for transferring the finished picture from said chamber to said delivery chute comprising relatively movable members for ejecting the finished picture from said chamber to said delivery chute.

7. In a photographic machine, a camera for exposing a sensitized plate while the latter is in horizontal position, a chamber in which said plate is treated, pivotally mounted means for receiving said plate in the horizontal position thereof after its exposure in said camera and for supporting said plate in horizontal position in said chamber, said supporting means comprising an open-top tray, means for applying a liquid to said plate within said chamber, means for turning said pivotally mounted supporting means for tilting said plate to drain the liquid therefrom, a rotary cam member, and means releasably engaged by said rotary cam member for actuating said means for turning said pivotally mounted plate-supporting means to tilt said plate.

8. In a photographic machine, a chamber for treating exposed plates to develop the same and finish the pictures thereon, means movably mounted on a horizontal pivot for supporting one of said plates in horizontal position in said chamber with the sensitized surface of said plate uppermost, means for applying a plurality of liquids to said surface at different times, a rotary cam unit, means operable under the control of said cam unit for controlling said liquid applying means, and means also operable under the control of said cam unit for moving said plate supporting means with the plate thereon, about said horizontal pivot for tilting the plate for removing one of the liquids therefrom before the application of the next liquid, said last mentioned means comprising a lever having one end thereof engaged by said cam and the other end of said lever being provided with a slot, and a crank on said plate support engaging said lever in said slot.

9. In a photographic machine, a camera for exposing a sensitized plate while the latter is in horizontal position, a chamber in which said plate is treated, means for supporting said plate in a horizontal position in said chamber, said plate supporting means being mounted for turning movement on a horizontal pivot, means for applying a liquid to said plate within said chamber, and means for turning said supporting means on said pivot for tilting said plate to drain the liquid therefrom.

10. In a photographic machine, a camera for exposing a sensitized plate while the latter is in horizontal position, a chamber in which said plate is treated, means for supporting said plate in a horizontal position in said chamber, said plate supporting means being mounted for turning movement on a horizontal pivot, means for moving said exposed plate in horizontal position from said camera to the supporting means in said chamber, with the sensitized surface of said plate uppermost, means for applying a liquid to said surface within said chamber, and means for turning said supporting means on said pivot for tilting said plate to drain the liquid therefrom.

11. In a photographic machine, a camera for exposing a sensitized plate while the latter is in horizontal position, a chamber in which said plate is treated, means for supporting said exposed plate in a horizontal position in said chamber, with the sensitized surface of said plate uppermost, said plate supporting means being mounted for turning movement on a horizontal pivot, means for applying at intervals a plurality of liquids to said surface within said chamber, and means for automatically turning said supporting means on said pivot for tilting said plate between the applications of liquid thereto whereby to drain one liquid therefrom before the next liquid is applied.

12. In a photographic machine, a camera for exposing a sensitized plate while the latter is in horizontal position, a chamber in which said plate is treated, means for supporting said plate in a horizontal position in said chamber with the sensitized surface thereof uppermost, said plate supporting means being mounted for turning movement on a horizontal pivot, means for applying a developing liquid to said surface within said chamber, means for turning said plate supporting means on said pivot for tilting said plate to drain the liquid therefrom, means in said chamber for re-exposing said plate, and means for applying a developing liquid to said re-exposed plate.

13. In a photographic machine, a camera for exposing a sensitized plate while the latter is in horizontal position, a chamber for treating exposed plates to develop and finish the pictures, a magazine of unexposed sensitized plates, means for projecting said plates successively from said magazine to said camera and from said camera to said chamber, means for supporting an exposed plate in horizontal position in said chamber with the sensitized surface thereof uppermost, means for applying a developing liquid to said surface in said chamber while said plate is in horizontal position, said plate supporting means being mounted for turning movement on a horizontal pivot, mechanism for actuating said plate supporting means to move the latter from horizontal position to a position for draining liquid from said plate, a rotary cam unit for actuating said plate-projecting means and said mechanism for said movable plate-supporting means, and means associated with said cam unit for controlling the flow of liquid to said chamber for application to the plate therein.

14. In a photographic machine, a camera for exposing a sensitized plate, a chamber for treating exposed plates to develop and finish the pictures, a magazine of unexposed sensitized plates, means for projecting said plates successively from said magazine to said camera and from said camera to said chamber, movable means for supporting an exposed plate in horizontal position in said chamber with the sensitized surface thereof uppermost, means for applying a developing liquid to said surface in said chamber while said plate is in horizontal position, mechanism for actuating said supporting means to move the latter from horizontal position to a position for draining liquid from said exposed plate, an electric lamp in said chamber for re-exposing said developed plate, a switch for controlling the circuit of said lamp, a rotary cam unit for actuating said plate-projecting means and said mechanism for moving said plate-supporting means, means associated with said cam unit for controlling the flow of liquid to said chamber for application to said exposed plate, and means operable under the control of said cam unit for actuating said switch to complete and interrupt the circuit through said lamp after the application of said developing liquid thereto.

15. In a photographic machine, a camera for exposing sensitized plates, a chamber for developing and finishing plates exposed in said camera, a magazine for unexposed sensitized plates, means for projecting said sensitized plates from said magazine to said camera and, after said plates are exposed, from said camera to said chamber, means for actuating said projecting means including two members having a connection which is released when said plate-projecting means encounters abnormal resistance to the movement thereof for projecting the plates.

16. In a photographic machine, a magazine for sensitized plates of the direct positive type, a camera for exposing said plates, a chamber in which said plates are treated for developing and completing the picture, means for moving the plates singly in horizontal position from said magazine to said camera for exposure therein, and, after exposure, to said chamber, means to treat said plates for the first development thereof, means for subsequently re-exposing said plates, means for treating said plates for the second development thereof, a rotary cam unit, means operable under the control of said cam unit for actuating said plate moving means and said means for treating the plate to develop, re-expose and re-develop the same, and means for supporting said plate in said chamber mounted for turning movement on a horizontal pivot and tiltable thereon from a plate supporting position to a downwardly inclined position for the removal of the plate from said supporting means.

17. In a photographic machine, a camera for exposing a sensitized plate in taking the picture, a chamber in which said plate is treated following the exposure thereof, means for moving said exposed plate from the camera to the chamber, means for applying a liquid to said plate in said chamber, and means for heating said liquid to a predetermined temperature before it is applied to the plate.

18. In a photographic machine, a camera for exposing a sensitized plate in taking the picture, a chamber in which said plate is treated following the exposure thereof, means for moving said exposed plate from the camera to the chamber, means for applying a liquid to said plate in said chamber, a supply-container for liquid, a heating chamber, a conduit for supplying liquid from said supply-container to said heating chamber, means for heating said liquid in said heating chamber, and a connection for supplying heated liquid from said heating chamber to said chamber in which said plate is treated for applying heated liquid to the plate.

19. In a photographic machine, a camera for exposing a sensitized plate in taking the picture, a chamber in which said plate is treated following the exposure thereof, means for moving said exposed plate from the camera to the chamber, means for applying a liquid to said plate in said chamber, a supply-container for liquid, means for separating a part of the liquid from said container and for supplying the separated liquid to said chamber for application to the plate therein, and means for heating only the separated liquid prior to the application thereof to said plate.

20. In a photographic machine, a camera for exposing a sensitized plate in taking the picture, a chamber in which said plate is treated following the exposure thereof, means for moving said exposed plate from the camera to the chamber, means for applying a liquid to said plate in said chamber, means for heating said liquid to a predetermined temperature before it is applied to the plate, a supply-container for liquid, and means in said container supported on and covering the liquid therein and movable in said container in contact with the upper surface of said liquid to prevent substantially the access of air to the liquid in the container.

21. In a photographic machine, a camera for exposing a sensitized plate, a chamber in which said plate is treated after its exposure, a support for said plate mounted for turning movement in said chamber on a horizontal pivot, means for applying a liquid to the plate while the same is carried by said support, a delivery chute, means for turning said plate support on said pivot, and means operable to actuate said turning means to turn said support a predetermined extent to tilt the plate for draining the liquid therefrom and to subsequently turn said support to a greater extent in the same direction for ejecting said plate from said support into said delivery chute.

22. In a photographic machine, a camera for exposing a sensitized plate, a chamber in which said plate is treated after its exposure, a support for said plate mounted for turning movement in said chamber on a horizontal pivot, means for applying a liquid to the plate while the same is carried by said support, a delivery chute, means for turning said plate support on said pivot, and cam actuated means operable to actuate said turning means to turn said support a predetermined extent to tilt the plate for draining the liquid therefrom and to subsequently turn said support to a greater extent in the same direction for ejecting said plate from said support into said delivery chute.

23. In a photographic machine, a camera for exposing a sensitized plate, a chamber in which said plate is treated after its exposure, a support for said plate mounted for turning movement in said chamber on a horizontal pivot, means for applying a liquid to the plate while the same is carried by said support, a delivery chute, means for turning said plate support on said pivot, and cam actuated means operable to actuate said turning means to turn said support a predetermined extent to tilt the plate for draining the liquid therefrom and to subsequently turn said support to a greater extent in the same direction for ejecting said plate from said support into said delivery chute, said cam actuated means comprising a pivoted lever having one end operatively connected to said support for turning the same, and a cam means engageable with the other end of said lever for moving the first mentioned end of the lever first to turn said support to plate-draining position and subsequently to turn said support to plate-ejecting position.

24. In a photographic machine, a chamber in which an exposed plate is treated, a support for said plate mounted for turning movement in said chamber on a horizontal pivot, and means for intermittently turning said plate-support on its pivot to tilt said plate, said means comprising a lever pivoted between its ends and having one end thereof operatively connected to said plate-support for turning the latter, a rotary member, and a plurality of cam members carried by said rotary member successively engageable with the other end of said lever, during the rotation of said rotary member, for actuating said lever to turn said plate-support.

25. In a photographic machine, a chamber in which an exposed plate is treated, a support for said plate mounted for turning movement in said chamber on a horizontal pivot, and means for intermittently turning said plate-support on its pivot to tilt said plate, said means comprising a lever pivoted between its ends and having one end thereof operatively connected to said plate-support for turning the latter, a rotary member, and a plurality of cam members carried by said rotary member in circumferentially spaced relation thereon for successively engaging the other end of said lever, during the rotation of said rotary member, for actuating said lever to turn said plate-support.

26. In a photographic machine, a chamber in which an exposed plate is treated, a support for said plate mounted for turning movement in said chamber on a horizontal pivot, and means for intermittently turning said plate-support on its pivot to tilt said plate, said means comprising a lever pivoted between its ends and having one end thereof operatively connected to said plate-support for turning the latter, a rotary member, and a plurality of cam members carried by said rotary member successively engageable with the other end of said lever, during the rotation of said rotary member, for actuating said lever to turn said plate-support, one of said cam members having a part for moving the lever sufficiently to turn said support to a position for ejecting the plate therefrom.

27. In a photographic machine, a chamber in which an exposed plate is treated, a support for said plate mounted for turning movement in said chamber on a horizontal pivot, and means for intermittently turning said plate-support on its pivot to tilt said plate, said means comprising a lever pivoted between its ends and having one end thereof operatively connected to said plate-support for turning the latter, a rotary member, and a plurality of cam members carried by said rotary member successively engageable with the other end of said lever, during the rotation of said rotary member, for actuating said lever to turn said plate-support, and stationary means engageable with said plate in one of the positions of said support for moving the plate in relation to said support for ejecting the plate therefrom.

28. In a photographic machine, a camera for exposing a sensitized plate, a chamber in which the sensitized plate is treated after exposure thereof, means for projecting said plate into position in the camera and from the camera to said chamber, a lamp for illuminating the subject to be photographed, a lamp in said chamber for re-exposing the plate therein, a rotary cam unit provided with a plurality of cam members, a lever operable by one of said cam members for projecting said plate, a pivoted lever engageable with one of said cam members and carrying a mercury switch for controlling the circuit of said first lamp, and a pivoted lever engageable with one of said cam members and carrying a mercury switch for controlling the circuit of said second lamp.

WILLIAM RABKIN.
LEO EINAR LARSEN.